United States Patent
Shan et al.

(10) Patent No.: US 12,488,376 B2
(45) Date of Patent: Dec. 2, 2025

(54) SERVICE EXECUTION SYSTEM AND RELATED PRODUCT

(71) Applicant: Huawei Cloud Computing Technologies Co., Ltd., Guizhou (CN)

(72) Inventors: Weihua Shan, Xi'an (CN); Yang Dong, Xi'an (CN); Huang Xu, Xi'an (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 103 days.

(21) Appl. No.: 18/436,760

(22) Filed: Feb. 8, 2024

(65) Prior Publication Data

US 2024/0177215 A1     May 30, 2024

Related U.S. Application Data

(63) Continuation of application No. PCT/CN2022/101184, filed on Jun. 24, 2022.

(30) Foreign Application Priority Data

Aug. 12, 2021    (CN) .......................... 202110924702.9

(51) Int. Cl.
*G06Q 30/00*         (2023.01)
*G06N 5/022*         (2023.01)
*G06Q 30/0601*     (2023.01)

(52) U.S. Cl.
CPC ......... *G06Q 30/0631* (2013.01); *G06N 5/022* (2013.01)

(58) Field of Classification Search
None
See application file for complete search history.

(56) References Cited

U.S. PATENT DOCUMENTS 8,533,224 B2 *   9/2013   Lin ........................ G06N 20/00
                                                      707/777
10,515,313 B2 *   12/2019   Kaplow ................ G06N 5/043

FOREIGN PATENT DOCUMENTS

CN           109308552 A     2/2019

OTHER PUBLICATIONS

Behera Rajat Kumar et al., "A rule-based automated machine learning approach in the evaluation of recommender engine", Benchmarking, vol. 27, No. 10, Aug. 14, 2020 (Aug. 14, 2020), pp. 2721-2757, XP093213353, 36 pages.

* cited by examiner

*Primary Examiner* — Mila Airapetian
(74) *Attorney, Agent, or Firm* — Conley Rose, P.C.

(57) ABSTRACT

A service execution system includes a service execution apparatus and a decision apparatus. The service execution apparatus collects a first quantity of service requests from a received service request to obtain a first sample set, and sends the first sample set to the decision apparatus. The decision apparatus evaluates a first model and a first policy based on the first sample set, then the decision apparatus processes following steps based on an evaluation result of the first model.

20 Claims, 6 Drawing Sheets

SERVICE EXECUTION SYSTEM AND RELATED PRODUCT

CROSS-REFERENCE TO RELATED APPLICATIONS

This is a continuation of International Patent Application No. PCT/CN2022/101184 filed on Jun. 24, 2022, which claims priority to Chinese Patent Application No. 202110924702.9 filed on Aug. 12, 2021, both of which are hereby incorporated by reference in their entireties.

TECHNICAL FIELD

This disclosure relates to the field of artificial intelligence (AI) technologies, and in particular, to a service execution system and a related product.

BACKGROUND

As AI technologies develop rapidly, data-driven has become an inevitable trend. The data-driven means to use data as an input of an AI model to train the AI model, and then use a trained AI model to perform service decision, to further guide service execution. However, sometimes prediction of the AI model is inaccurate. Consequently, the service decision is inaccurate, and the service execution is faulty. Therefore, how to improve credibility of the service decision is a problem that needs to be resolved urgently.

SUMMARY

This disclosure discloses a service execution system and a related product, to improve credibility of service decision.

According to a first aspect, this disclosure provides a service execution system. The system includes a service execution apparatus and a decision apparatus. The service execution apparatus collects a first quantity of service requests from a received service request, to obtain a first sample set, and sends the first sample set to the decision apparatus. The decision apparatus evaluates a first model and a first policy based on the first sample set. When an evaluation result of the first model is better than an evaluation result of the first policy, the decision apparatus sends the first model to the service execution apparatus, and the service execution apparatus processes a future received service request based on the first model. When an evaluation result of the first policy is better than an evaluation result of the first model, the decision apparatus sends the first policy to the service execution apparatus, and the service execution apparatus processes a future received service request according to the first policy. The credibility of service decision can be improved via the service execution system.

The service execution system evaluates an AI model and a policy by using a received service request, to select a decision manner having a better evaluation result as a final decision manner, and process a future service request in the decision manner. In this way, a phenomenon that service execution is faulty due to inaccurate prediction of the AI model can be reduced, and credibility of the service execution can be improved.

In a possible implementation, before that the decision apparatus evaluates a first model and a first policy based on the first sample set, the service execution apparatus collects a second quantity of service requests from the received service request, to obtain a second sample set. The second sample set includes a training sample set and a test sample set. Then, the service execution apparatus sends the second sample set to the decision apparatus. The decision apparatus obtains a plurality of models. The plurality of models include a model that is obtained by the decision apparatus by training an initial model based on the training sample set, and a model that is obtained by the decision apparatus by training the initial model based on a historical service request. The historical service request is received by the service execution apparatus before the service execution apparatus collects the second quantity of service requests from the received service request. Then, the decision apparatus evaluates the plurality of models based on the test sample set, to determine the first model. The first model is a model having a best evaluation result in the plurality of models.

In the implementation, the decision apparatus trains the initial model by using the training sample set, to obtain the trained model, and then evaluates, by using the test sample set, the plurality of models including the trained model, to determine the first model that is applicable to the current service request, so that the first model has higher credibility.

In a possible implementation, before that the decision apparatus evaluates a first model and a first policy based on the first sample set, the decision apparatus obtains a plurality of policies, and evaluates the plurality of policies based on the second sample set, to determine the first policy. The first policy is a policy having a best evaluation result in the plurality of policies. In this way, the first policy that is applicable to the current service request may be determined, so that the first policy has higher credibility.

In a possible implementation, the first sample set and the second sample set are a same sample set, or the first sample set includes the second sample set.

According to a second aspect, this disclosure provides a decision method. The method is applied to a service execution system. The service execution system includes a service execution apparatus and a decision apparatus. The method includes the following steps. The decision apparatus obtains a first sample set. The first sample set includes a first quantity of service requests collected by the service execution apparatus from a received service request. Then, the decision apparatus evaluates a first model and a first policy based on the first sample set. When an evaluation result of the first model is better than an evaluation result of the first policy, the decision apparatus sends the first model to the service execution apparatus, to enable the service execution apparatus to process a future received service request based on the first model. When an evaluation result of the first policy is better than an evaluation result of the first model, the decision apparatus sends the first policy to the service execution apparatus, to enable the service execution apparatus to process a future received service request according to the first policy.

In a possible implementation, before that the decision apparatus evaluates a first model and a first policy based on the first sample set, the method further includes the following steps. The decision apparatus obtains a second sample set. The second sample set includes a second quantity of service requests collected by the service execution apparatus from the received service request, and the second sample set includes a training sample set and a test sample set. The decision apparatus obtains a plurality of models. The plurality of models include a model that is obtained by the decision apparatus by training an initial model based on the training sample set, and a model that is obtained by the decision apparatus by training the initial model based on a historical service request. The historical service request is received by the service execution apparatus before the service execution apparatus collects the second quantity of service requests from the received service request. Then, the decision apparatus evaluates the plurality of models based on the test sample set, to determine the first model. The first model is a model having a best evaluation result in the plurality of models.

In a possible implementation, before that the decision apparatus evaluates a first model and a first policy based on the first sample set, the method further includes the following steps. The decision apparatus obtains a plurality of policies, and evaluates the plurality of policies based on the second sample set, to determine the first policy. The first policy is a policy having a best evaluation result in the plurality of policies.

In a possible implementation, the first sample set and the second sample set are a same sample set, or the first sample set includes the second sample set.

According to a third aspect, this disclosure provides a decision apparatus. The decision apparatus is used in a service execution system. The service execution system includes a service execution apparatus and the decision apparatus. The decision apparatus includes a data obtaining unit and a decision unit. The data obtaining unit is configured to obtain a first sample set. The first sample set includes a first quantity of service requests collected by the service execution apparatus from a received service request. The decision unit is configured to evaluate a first model and a first policy based on the first sample set. When an evaluation result of the first model is better than an evaluation result of the first policy, the decision unit is further configured to send the first model to the service execution apparatus, to enable the service execution apparatus to process a future received service request based on the first model. When an evaluation result of the first policy is better than an evaluation result of the first model, the decision unit is further configured to send the first policy to the service execution apparatus, to enable the service execution apparatus to process a future received service request according to the first policy.

In a possible implementation, the decision apparatus further includes a model training unit and an optimal model selection unit. The data obtaining unit is further configured to obtain a second sample set. The second sample set includes a second quantity of service requests collected by the service execution apparatus from the received service request, and the second sample set includes a training sample set and a test sample set. The model training unit is configured to obtain a plurality of models. The plurality of models include a model that is obtained by the model training unit by training an initial model based on the training sample set, and a model that is obtained by the model training unit by training the initial model based on a historical service request. The historical service request is received by the service execution apparatus before the service execution apparatus collects the second quantity of service requests from the received service request. The optimal model selection unit is configured to evaluate the plurality of models based on the test sample set, to determine the first model. The first model is a model having a best evaluation result in the plurality of models.

In a possible implementation, the decision apparatus further includes an optimal policy selection unit. The optimal policy selection unit is configured to obtain a plurality of policies, and then evaluate the plurality of policies based on the second sample set, to determine the first policy. The first policy is a policy having a best evaluation result in the plurality of policies.

In a possible implementation, the first sample set and the second sample set are a same sample set, or the first sample set includes the second sample set.

According to a fourth aspect, this disclosure provides a computing device. The computing device includes a processor and a storage. The storage stores computer instructions, and the processor executes the computer instructions, to enable the computing device to perform the method provided in any one of the second aspect or the possible implementations of the second aspect.

According to a fifth aspect, this disclosure provides a computer-readable storage medium. The computer-readable storage medium stores computer instructions. When the computer instructions are executed by a computing device, the computing device is enabled to perform the method provided in any one of the second aspect or the possible implementations of the second aspect.

BRIEF DESCRIPTION OF DRAWINGS

To describe the technical solutions in embodiments of this disclosure more clearly, the following briefly describes the accompanying drawings for describing embodiments. It is clear that the accompanying drawings in the following descriptions show some embodiments of this disclosure, and a person of ordinary skill in the art may still derive other drawings from these accompanying drawings without creative efforts.

DESCRIPTION OF EMBODIMENTS

The following describes the technical solutions of this disclosure with reference to the accompanying drawings.

To make the technical solutions provided in this disclosure clearer, related terms are first explained before the technical solutions provided in this disclosure are specifically described.

Figure 1:
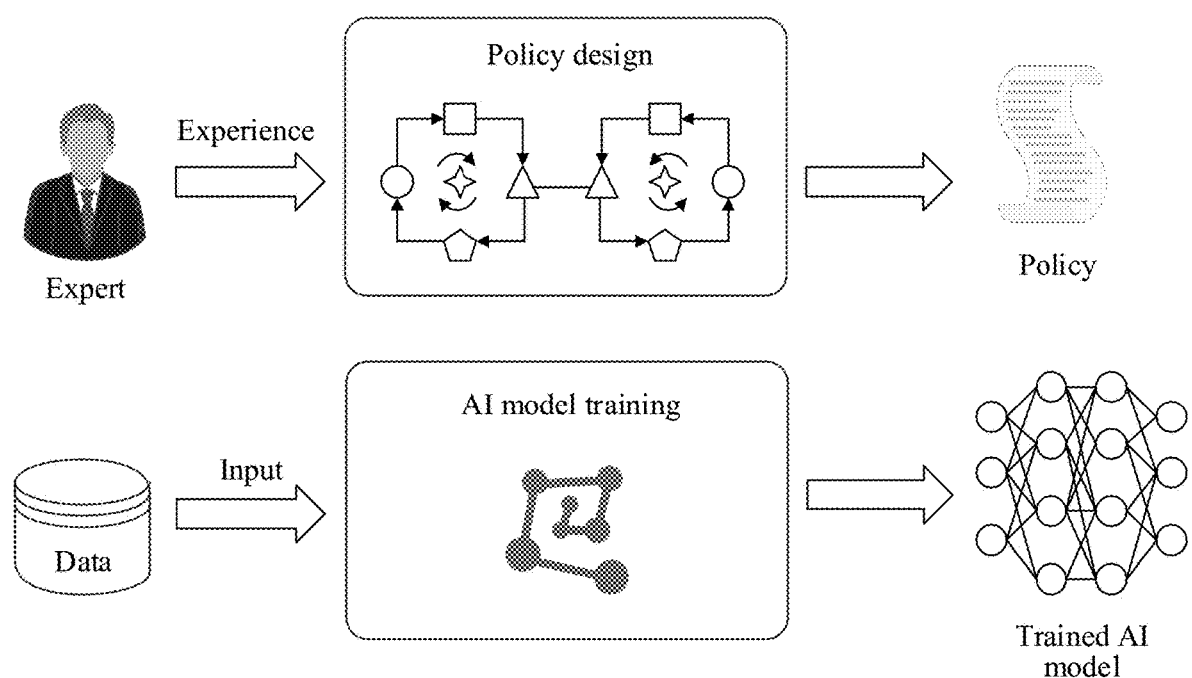
FIG. 1 is a schematic diagram of process-driven and data-driven according to this disclosure.

Process-driven and data-driven: As shown in FIG. 1, the process-driven is a method for service decision and service execution based on experts' experience. Specifically, the process-driven means to design a series of policies based on experts' experience and intuition, and then use the policies to perform service decision, to further guide the service execution. The data-driven is a method for service decision and service execution based on data. Specifically, the data-driven means to use the data as an input of an AI model to train the AI model, and then use a trained AI model to perform service decision, to further guide the service execution.

An AI model is a mathematical algorithm model for resolving an actual problem by using a machine-learning idea. The AI model includes a large quantity of parameters and calculation formulas. The parameters in the AI model are values obtained by training the AI model by using a dataset. For example, the parameters in the AI model are weights of the calculation formulas or factors in the AI model. For a given numerical input, the AI model provides a group of numerical outputs.

There are various AI models. Common AI models include a neural network model, a random forest, a support vector machine, and the like. Most AI models need to be trained before being used to complete a task. AI model training is using existing data and a specific method to enable the AI model to fit a law of the existing data, and determine the parameters in the AI model. The dataset needs to be used for training one AI model. Based on whether data in the dataset has a label (in other words, whether the data has a specific type or name), the AI model training may be classified into supervised training and unsupervised training. When supervised training is performed on the AI model, the data in the dataset used for training has a label. During the AI model training, the data in the dataset is used as the input of the AI model, and the label corresponding to the data is used as a reference of an output value of the AI model. Then, the parameters in the AI model are adjusted based on a difference between the output value of the AI model and the label corresponding to the input data. The AI model is iteratively trained by using each piece of data in the dataset, and the parameters of the AI model are continuously adjusted until the AI model can accurately output, based on the input data, an output value that is the same as the label corresponding to the data. When unsupervised training is performed on the AI model, the data in the dataset used for training does not have a label. During the AI model training, data in the dataset is input to the AI model at one time. The AI model gradually identifies an association and a potential rule between the data until the AI model can be used to determine or identify a type or feature of the input data.

A heuristic policy is a decision method that includes one or more policies. For example, a least recently used (LRU) policy in a cache is a heuristic policy. The LRU policy defines a case that when storage space of the cache is insufficient, a least recently accessed object in the cache is evicted to store a new object.

The following describes an application scenario in this disclosure.

The technical solutions provided in this disclosure are applicable to scenarios related to service decision, for example, scenarios such as intelligent recommendation, intelligent question and answer (such as a dialogue robot), and cache. The following briefly describes the service decision by using a cache scenario in a CDN as an example.

Figure 2:
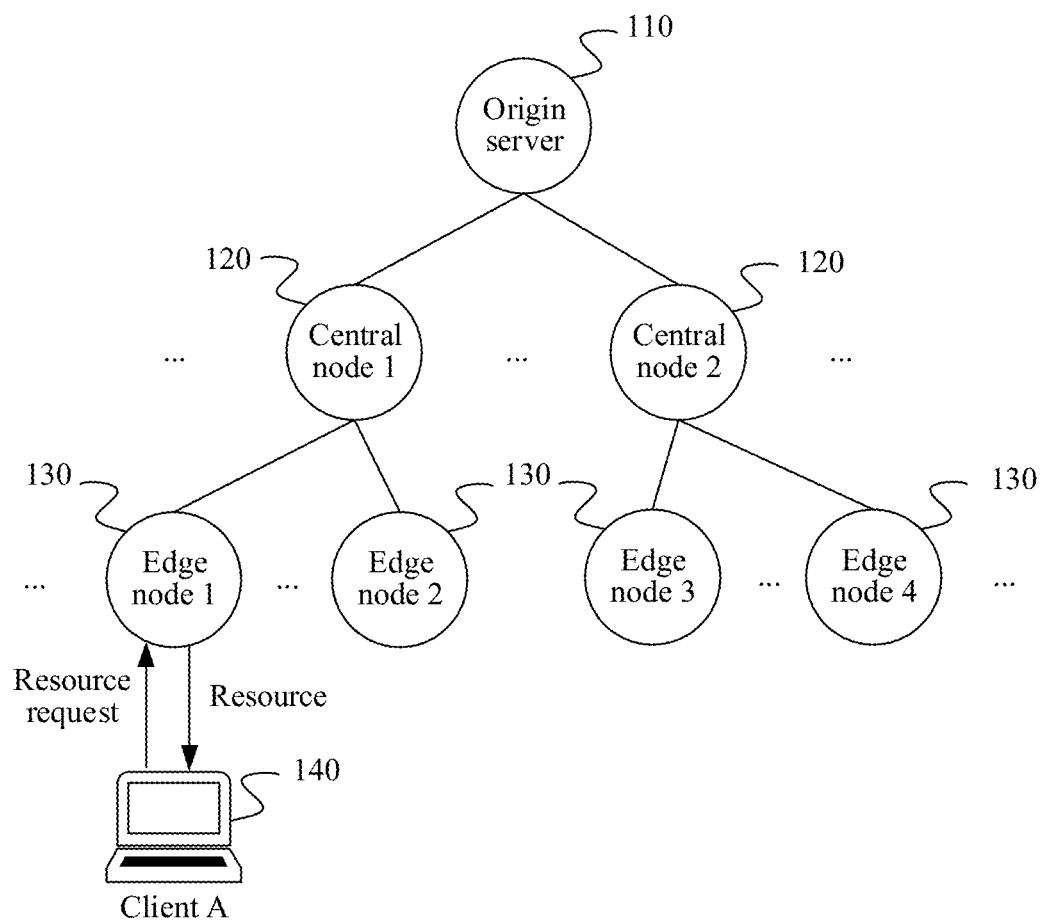
FIG. 2 is a schematic diagram of a structure of a content delivery network (CDN) according to this disclosure.

The CDN is a layer of intelligent virtual network constructed on the basis of an existing internet. FIG. 2 is a schematic diagram of a structure of the CDN. As shown in FIG. 2, the CDN includes an origin server 110, central nodes 120 (for example, a central node 1 and a central node 2), and edge nodes 130 (for example, an edge node 1 to an edge node 4). The origin server is a network node in which an actual service of a user is located. An edge node is a network node that has fewer intermediate stages away from final user access, and has a good response capability and connection speed for the final user access. A central node is a network node for transmitting data between the origin server and the edge node.

In the CDN, a resource in the origin server 110 is cached to the edge node 130, so that a user 140 (for example, a client A) can obtain a required resource nearby, to improve a response speed of accessing the resource by the user, and further reduce access pressure of the origin server 110. In this case, there are a series of problems related to service decision. Which resource in the origin server 110 is cached to the edge node 130? When is the resource in the origin server 110 cached to the edge node 130? Which level of cache in the edge node 130 is the resource cached to? How long does the resource need to be cached in the cache? It should be noted herein that, in embodiments of this disclosure, the edge node 130 may be provided with a plurality of levels of caches, to cache the resource in the origin server 110. Specifically, it is assumed that a storage of the edge node 130 includes a memory, a solid-state drive (SSD), and a hard disk. The memory may be used as a level-1 cache, the SSD may be used as a level-2 cache, and the hard disk may be used as a level-3 cache.

In a conventional technology, service decision of the cache is mainly implemented via an AI model. However, it should be noted prediction of the AI model has a probability. In other words, the AI model cannot implement complete accurate prediction. For example, it is assumed that the AI model is used to predict that a quantity of access times of a resource 1 in a current time period is large. The origin server 110 caches the resource 1 to the edge node 130 in advance. However, an actual case is that a quantity of access times of a resource 2 in the current time period is large. In this case, if the client A sends a request about the resource 2 to the edge node 1, the edge node 1 needs to request the resource from the central node 1 or the origin server because the resource 2 is not cached in the edge node 1. Consequently, a large amount of bandwidth is consumed.

Similarly, the problem also exists in intelligent recommendation and intelligent question and answer. The intelligent recommendation is using an AI model to predict a thing (for example, a movie, a commodity, or a book) that a user may be interested in, and recommending the thing that the user is interested in to the user, to promote a purchase desire of the user. However, in this process, if the user is not interested in the thing predicted by the AI model, purchase experience of the user is affected. The intelligent question and answer is using an AI model pair to determine an answer to a question input by a user and returning the answer to the user. In this process, if the answer determined by the AI model is inaccurate, the user cannot obtain a desired answer.

In general, compared with a policy, the AI model can have a better prediction capability by learning a large amount of data. However, sometimes prediction of the AI model is inaccurate. Consequently, the service decision is inaccurate, and service execution is faulty.

For the foregoing problems, this disclosure provides a service execution system. The service execution system evaluates an AI model and a policy, to select a decision manner having a better evaluation result as a final decision manner, and process a future service request in the decision manner. In this way, a phenomenon that the service execution is faulty due to inaccurate prediction of the AI model can be reduced, and credibility of the service execution can be improved.

Figure 3:
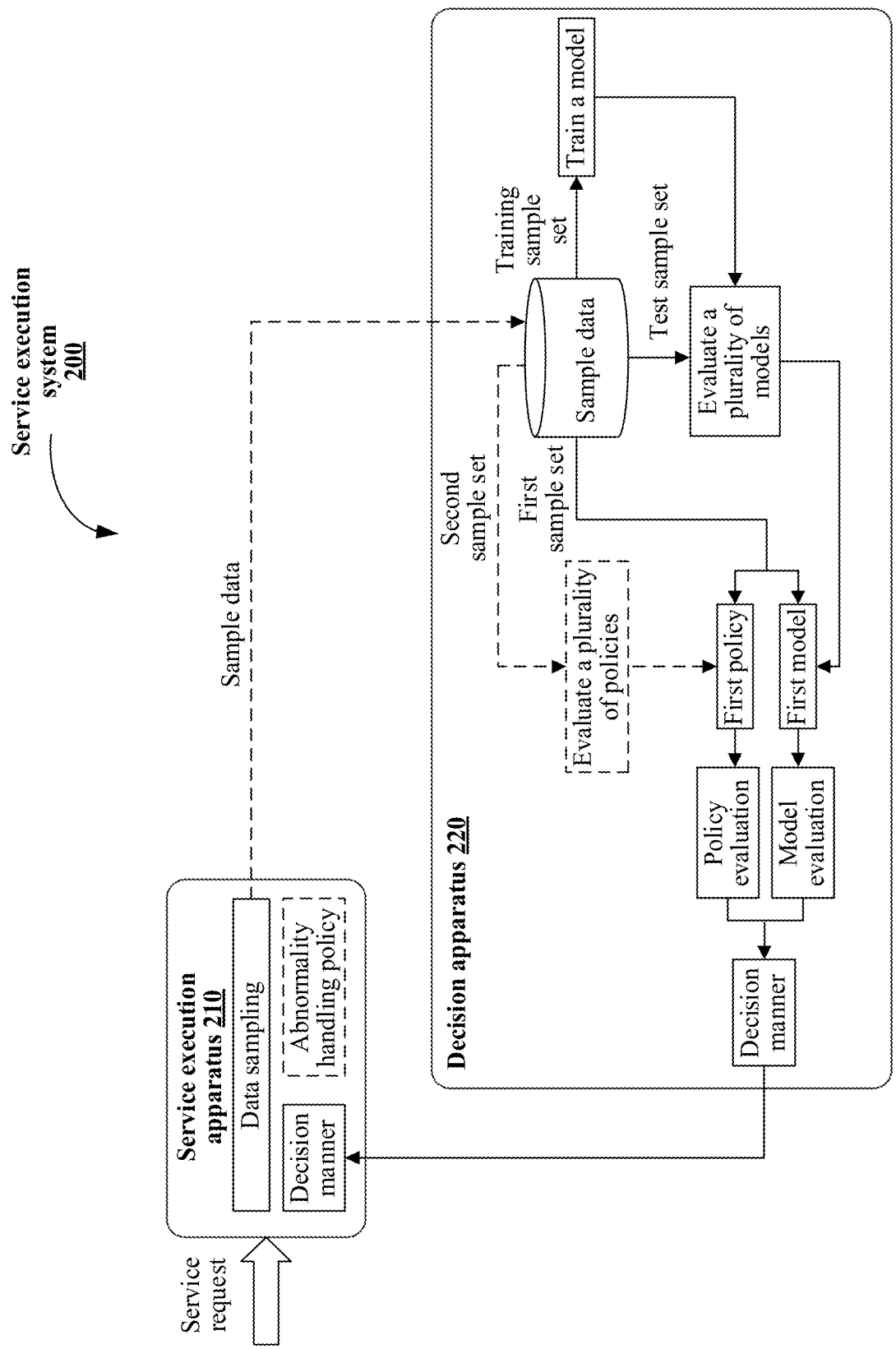
FIG. 3 is a schematic diagram of a structure of a service execution system according to this disclosure.

FIG. 3 is a schematic diagram of a structure of a service execution system according to this disclosure. As shown in FIG. 3, the service execution system 200 includes a service execution apparatus 210 and a decision apparatus 220. A communication connection is established between the service execution apparatus 210 and the decision apparatus 220. The communication connection may be a wired communication connection (for example, an Ethernet, a controller area network, or a local interconnection network), or may be a wireless communication connection (for example, a cellular network or a wireless local area network).

In an embodiment of this disclosure, the service execution apparatus 210 collects a first quantity of service requests from a received service request, to obtain a first sample set, and sends the first sample set to the decision apparatus 220. After receiving the first sample set, the decision apparatus 220 evaluates a first model and a first policy based on the first sample set. When an evaluation result of the first model is better than an evaluation result of the first policy, the decision apparatus 220 sends the first model to the service execution apparatus 210, and the service execution apparatus 210 processes a future received service request based on the first model. When an evaluation result of the first policy is better than an evaluation result of the first model, the decision apparatus 220 sends the first policy to the service execution apparatus 210, and the service execution apparatus 210 processes a future received service request according to the first policy.

Optionally, before that the decision apparatus 220 evaluates a first model and a first policy based on the first sample set, the service execution apparatus 210 collects a second quantity of service requests from the received service request, to obtain a second sample set; and then sends the second sample set to the decision apparatus 220. The decision apparatus 220 obtains a plurality of models. The plurality of models include a model that is obtained by the decision apparatus 220 by training an initial model based on a training sample set, and a model that is obtained by the decision apparatus 220 by training the initial model based on a historical service request. The historical service request is received by the service execution apparatus 210 before the service execution apparatus 210 collects the second quantity of service requests from the received service request. Then, the decision apparatus 220 evaluates the plurality of models based on a test sample set, to determine the first model. The first model is a model having a best evaluation result in the plurality of models.

Optionally, before that the decision apparatus 220 evaluates a first model and a first policy based on the first sample set, the decision apparatus 220 obtains a plurality of policies, and evaluates the plurality of policies based on the second sample set, to determine the first policy. The first policy is a policy having a best evaluation result in the plurality of policies.

Optionally, the first sample set and the second sample set are a same sample set, or the first sample set includes the second sample set.

Optionally, to further improve reliability of the service execution system, the service execution apparatus 210 further stores an abnormality handling policy. When the service execution apparatus 210 or the service request is abnormal, or a processing result obtained through processing the future service request by the service execution apparatus 210 based on the first model or according to the first policy is abnormal, the service execution apparatus 210 processes the future service request according to the abnormality handling policy.

In a service execution process, a service request that needs to be processed by the service execution apparatus 210 changes with time, and a fixed decision manner (an AI model or a policy) may not be applicable to service requests in different time periods. In this case, the service requests in the different time periods may be processed in different decision manners, to ensure accurate processing of the service requests in the different time periods. In view of this case, the decision apparatus 220 may be set to periodically determine a decision manner, and send the determined decision manner to the service execution apparatus 210, so that the service execution apparatus 210 processes a subsequent service request based on the decision manner. For brevity, this embodiment of this disclosure describes only a specific process in which the decision apparatus 220 determines a decision manner (namely, a decision manner having a better evaluation result in the first model or the first policy) in one periodicity. It should be understood that, during actual application, a process in which the decision apparatus 220 periodically determines a decision manner is similar to the foregoing process. Details are not described herein again.

Optionally, to improve service execution efficiency and accuracy, the decision apparatus 220 may determine the first model from the plurality of models offline, determine the first policy from the plurality of policies, and then determine the decision manner online (namely, the decision manner having the better evaluation result in the first model or the first policy). The service execution apparatus 210 may process the future received service request online based on the foregoing decision manner. Alternatively, the decision apparatus 220 may determine the decision manner (the decision manner having the better evaluation result in the first model or the first policy) offline, and the service execution apparatus 210 may process the future received service request online based on the foregoing decision manner.

In this embodiment of this disclosure, both the service execution apparatus 210 and the decision apparatus 220 are software apparatuses. Optionally, the service execution apparatus 210 and the decision apparatus 220 may be deployed on a same computing device, or may be deployed on different computing devices. Both the service execution apparatus 210 and the decision apparatus 220 may be logically divided into a plurality of parts. For example, the service execution apparatus 210 may include a data sampling unit and an execution unit. The data sampling unit is configured to collect the first sample set and the second sample set, and the execution unit is configured to process the future received service request based on the first model or according to the first policy. The decision apparatus 220 includes a data obtaining unit, a model training unit, an optimal model selection unit, an optimal policy selection unit, a decision unit, and the like. The data obtaining unit is configured to obtain the first sample set and the second sample set. The model training unit is configured to obtain the plurality of models. The optimal model selection unit is configured to determine the first model from the plurality of models. The decision unit is configured to evaluate the first model and the first policy, and send the decision manner having the better evaluation result in the first model or the first policy to the service execution apparatus 210. In this case, the service execution apparatus 210 and a part of the decision apparatus 220 may be further deployed on a same computing device. For example, the service execution apparatus 210 and the decision unit in the decision apparatus 220 are deployed on a same computing device, and the model training unit, the optimal model selection unit, the decision unit, and the like of the decision apparatus 220 are deployed on another computing device. Alternatively, a part of the service execution apparatus 210 and the decision apparatus 220 may be deployed on a same computing device. For example, the data sampling unit in the service execution apparatus 210 and the decision apparatus 220 are deployed on a same computing device, and the execution unit in the service execution apparatus 210 is deployed on another computing device. This is not specifically limited in this disclosure.

Further, the decision apparatus 220 is flexibly deployed. It is considered that a large amount of sample data needs to be used for training, testing, and the like of the AI model, and a calculation amount is large. Therefore, the decision apparatus 220 may be deployed in a cloud environment. The cloud environment is an entity that provides a cloud service for a user by using a basic resource in a cloud computing mode. The cloud environment includes a cloud data center and a cloud service platform. The cloud data center includes a large quantity of basic resources (including a computing resource, a storage resource, and a network resource) owned by a cloud service provider. The computing resource included in the cloud data center may be a large quantity of computing devices (for example, servers). The decision apparatus 220 may be a server in the cloud data center, or may be a virtual machine created in the cloud data center, or may be a software apparatus deployed on a server or a virtual machine in the cloud data center. The software apparatus may be deployed on a plurality of servers in a distributed manner, may be deployed on a plurality of virtual machines in a distributed manner, or may be deployed on the virtual machine and the server in a distributed manner.

When the decision apparatus 220 is deployed in the cloud environment, the decision apparatus 220 may be abstracted by the cloud service provider into a cloud service (which is referred to as a service decision service below) on the cloud service platform, to provide the cloud service for the user. The user may purchase the cloud service via the cloud service platform, so that the decision apparatus 220 can complete determining of the decision manner. Alternatively, the decision apparatus 220 may be deployed by the user in a computing resource (for example, a virtual machine) in a cloud data center leased by the user. The user purchases, via the cloud service platform, a computing resource cloud service provided by the cloud service provider, and runs the decision apparatus 220 in the purchased computing resource, to complete determining of the decision manner. It should be understood that the functions provided by the decision apparatus 220 and the functions provided by the service execution apparatus 210 may also be abstracted together into one cloud service (which is referred to as a service execution service below). In this way, after the user purchases the service execution service, the decision manner may be determined, and the received service request may be further processed, to complete service execution.

Alternatively, the decision apparatus 220 may be deployed in an edge environment. The edge environment is a set of edge data centers or edge computing devices (for example, edge servers, edge stations having computing capabilities, or the like) that are close to a terminal computing device. The terminal computing device includes a terminal server, a smartphone, a laptop computer, a tablet computer, a personal desktop computer, an intelligent camera, and the like. When the decision apparatus 220 is deployed in the edge environment, the decision apparatus 220 may be independently deployed on one edge server or one virtual machine in the edge environment, or may be deployed on a plurality of edge servers or a plurality of virtual machines in the edge environment in a distributed manner, or a part of the decision apparatus 220 is deployed on an edge server and another part of the decision apparatus 220 is deployed on a virtual machine.

Alternatively, the decision apparatus 220 may be deployed on one or more terminal computing devices. Alternatively, the decision apparatus 220 may be deployed in different environments in a distributed manner. The different environments may include the cloud environment, the edge environment, and the terminal computing device.

Figure 4:
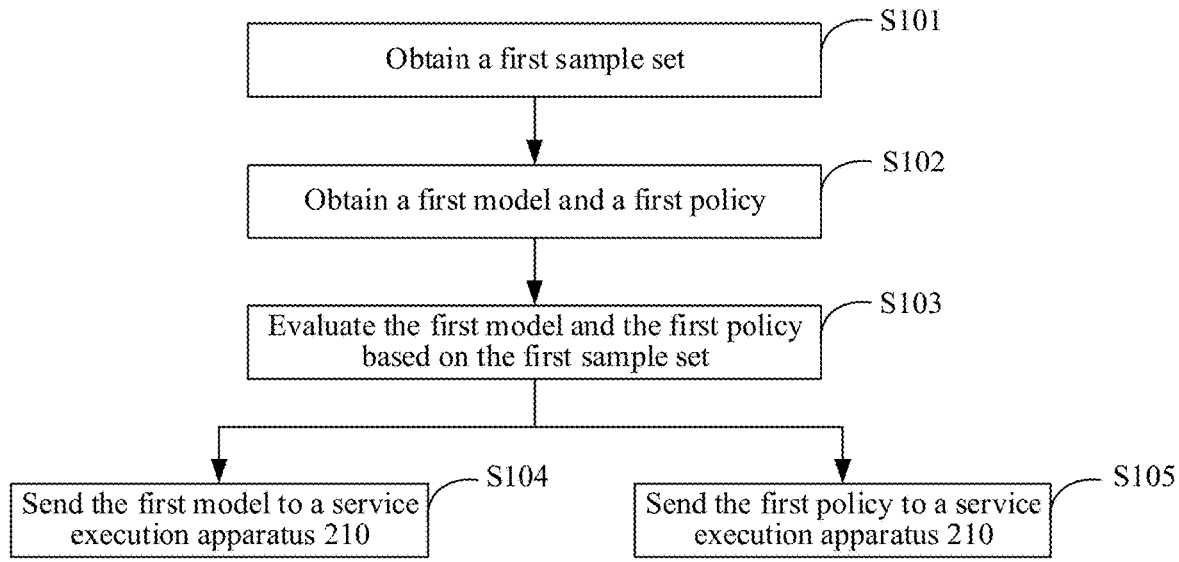
FIG. 4 is a schematic flowchart of a decision method according to this disclosure.

With reference to FIG. 4, the following further describes a specific process in which the decision apparatus 220 determines a decision manner.

FIG. 4 is a schematic flowchart of a decision method according to this disclosure. As shown in FIG. 4, the method includes but is not limited to the following steps.

S101: A decision apparatus 220 obtains a first sample set.

The first sample set includes a first quantity of service requests collected by a service execution apparatus 210 from a received service request.

Optionally, the first sample set further includes a label corresponding to the first quantity of service requests. For example, in the cache scenario shown in FIG. 2, a service request is used to access a resource, and a label corresponding to the service request includes a to-be-accessed resource, time and an address at which the to-be-accessed resource is cached to an edge node, and cache duration. For another example, in an intelligent recommendation scenario, a service request is used to recommend a thing to a user, and a label corresponding to the service request is a thing that the user is really interested in. For still another example, in an intelligent question and answer scenario, a service request is used to request an answer to a question, a label corresponding to the service request is a correct answer to the question.

In a specific embodiment, the decision apparatus 220 may obtain the first sample set in the following manner. The service execution apparatus 210 collects the first quantity of service requests from the received service request, adds the corresponding label to the collected first quantity of service requests, and sends the first quantity of service requests and the corresponding label as the first sample set to the decision apparatus 220. It should be understood that, the service execution apparatus 210 may add the corresponding label to the collected first quantity of service requests in the following manners. (1) The service execution apparatus 210 provides a graphical user interface (GUI). In this way, the user may add a manual label to the first quantity of service requests via the GUI. (2) The service execution apparatus 210 adds the corresponding label to the first quantity of service requests based on historical information. For example, in the intelligent recommendation scenario, the service execution apparatus 210 may determine, based on a related product that is added to favorites, purchased, and frequently browsed by the user, a thing that the user is interested in. For another example, in the cache scenario, the service execution apparatus 210 may determine, based on historical data cached in a cache that has a good cache effect, a to-be-accessed resource that needs to be cached to the edge node, time at which the to-be-accessed resource is cached to the edge node, a level of cache to which the to-be-accessed resource is cached on the edge node, cache duration, and the like. It should be understood that the decision apparatus 220 may alternatively obtain the first sample set in another manner. This is not specifically limited in this disclosure. For example, the decision apparatus 220 provides an application programming interface (API) or a GUI, so that the user uploads the first sample set to the decision apparatus 220.

It should be understood that, that the service execution apparatus 210 collects the first quantity of service requests from the received service request includes after receiving the service request, the service execution apparatus 210 determines whether the service request meets a sampling condition. If the service request meets the sampling condition, the service execution apparatus 210 collects the service request. If the service request does not meet the sampling condition, the service execution apparatus 210 does not collect the service request. The sampling condition may be correspondingly adjusted based on an actual case. The cache scenario shown in FIG. 2 is used as an example, and the sampling condition includes but is not limited to one or more of the following. Whether the service request is received by the service execution apparatus 210 at preset time; and whether a quantity of collected service requests is greater than a threshold.

Optionally, to not affect efficiency of processing the first quantity of service requests by the service execution apparatus 210, the step of collecting the first quantity of service requests by the service execution apparatus 210 and the step of processing the first quantity of service requests by the service execution apparatus 210 are performed asynchronously. In other words, a step of collecting a plurality of service requests by the service execution apparatus 210 and a step of processing the first quantity of service requests by the service execution apparatus 210 may be performed in parallel. For example, the step of collecting the plurality of service requests by the service execution apparatus 210 and the step of processing the first quantity of service requests by the service execution apparatus 210 are not completed in a same process.

Further, after obtaining the first sample set, the decision apparatus 220 may preprocess the service request and the corresponding label in the first sample set, for example, perform standardization processing on the service request and the label; check the service request, to remove an individual service request that severely affects a model training effect; and check the label corresponding to the service request, to remove or correct a service request whose label does not comply with the service request and the label corresponding to the service request. Optionally, the preprocessing step may alternatively be completed by the service execution apparatus 210. After completing the preprocessing step, the service execution apparatus 210 sends a preprocessed first sample set to the decision apparatus 220. This is not specifically limited in this disclosure.

S102: The decision apparatus 220 obtains a first model and a first policy.

In a specific embodiment, that the decision apparatus 220 obtains a first model includes. the decision apparatus 220 obtains a second sample set. The second sample set includes a second quantity of service requests collected by the service execution apparatus from the received service request, and the second sample set includes a training sample set and a test sample set. The decision apparatus obtains a plurality of models. The plurality of models include a model that is obtained by the decision apparatus by training an initial model based on the training sample set, and a model that is obtained by the decision apparatus by training the initial model based on a historical service request. The historical service request is received by the service execution apparatus before the service execution apparatus collects the second quantity of service requests from the received service request. Then, the decision apparatus evaluates the plurality of models based on the test sample set, to determine the first model. The first model is a model having a best evaluation result in the plurality of models.

It should be understood that a specific manner of training the initial model is not limited in this embodiment of this disclosure. For example, the decision apparatus 220 trains the initial model based on the training sample set. In a training manner, the decision apparatus 220 may perform supervised training on the initial model. Specifically, a service request in the training sample set is used as an input of the initial model, a label corresponding to the service request is used as a reference for an output value of the initial model, and then a parameter in the initial model is adjusted based on a difference between the label corresponding to the service request and the output value of the initial model. Then, the initial model is trained iteratively by using another service request in the training sample set, and the parameter of the initial model is continuously adjusted until an output value that is the same as the label corresponding to the service request can be accurately output based on the input service request, to obtain a trained model. In another training manner, the decision apparatus 220 may alternatively perform unsupervised training on the initial model. Specifically, service requests in the training sample set are input to the initial model at one time, and the initial model gradually learns a feature and a rule between these service requests until any other service requests that are similar to or of a same type as the service requests in the training sample set can be accurately predicted, to obtain a trained model.

More specifically, it can be learned from the foregoing descriptions that the decision apparatus 220 may periodically determine a decision manner. In other words, the decision apparatus 220 may periodically determine one model having a best evaluation result from the plurality of models. In this case, the plurality of models may include a model (which is referred to as a model A below) obtained through training based on the training sample set, and a model (which is referred to as a model B below) having a best evaluation result determined in a previous periodicity. That the decision apparatus 220 evaluates the plurality of models based on the test sample set, to determine the first model includes. the decision apparatus 220 evaluates the model A and the model B based on the test sample set, to determine a model having a better evaluation result as the first model. The decision apparatus 220 evaluates the model A and the model B based on the test sample set in various manners, for example:

1. A service request in the test sample set is input into the model A, and the model A outputs a predicted value corresponding to each service request. Then, the predicted value is compared with a label corresponding to the service request, to calculate a prediction accuracy rate (namely, a prediction accuracy rate A) of the model A for the service request in the test sample set. The prediction accuracy rate A is a ratio of a quantity of service requests that are in the test sample set and that are accurately predicted by the model A to a total quantity of service requests in the test sample set. Similarly, the service request in the test sample set is input into the model B, to calculate a prediction accuracy rate (namely, a prediction accuracy rate B) of the model B for the service request in the test sample set. The prediction accuracy rate B is a ratio of a quantity of service requests that are in the test sample set and that are accurately predicted by the model B to a total quantity of service requests in the test sample set. Then, the prediction accuracy rate A is compared with the prediction accuracy rate B, to determine a model corresponding to a larger prediction accuracy rate as the first model.

2. A service request in the test sample set is input into the model A, and the model A outputs a predicted value corresponding to each service request. Then, the predicted value is compared with a label corresponding to the service request, to calculate a root mean square error (RMSE) of the model A for the service request in the test sample set. Similarly, the service request in the test sample set is input into the model B, to calculate an RMSE of the model B for the service request in the test sample set. Then, the two RMSEs are compared, to determine a model corresponding to a smaller RMSE as the first model.

It should be understood that, in addition to Manner 1 and Manner 2, the decision apparatus 220 may further evaluate the model A and the model B from another aspect, for example, separately calculate a mean absolute error (MAE), a mean squared error (MSE), a silhouette coefficient, running time, a calculation amount, and the like of the model A and the model B for sample data in the test sample set. This is not specifically limited in this disclosure.

Optionally, after determining the first model, the decision apparatus 220 may store the first model, and delete other models from the plurality of models, to save storage resources.

In a specific embodiment, it is considered that, during actual application, the user may set a plurality of policies (for example, heuristic policies) for one service. Processing a same service request by using different policies may have different effects. Therefore, that the decision apparatus 220 obtains a first policy includes. the decision apparatus obtains a plurality of policies, and then evaluates the plurality of policies based on the second sample set, to determine the first policy, where the first policy is a policy having a better evaluation result in the plurality of policies. It should be understood that a manner in which the decision apparatus 220 evaluates the plurality of policies is similar to the manner in which the decision apparatus 220 evaluates the plurality of models. For brevity, details are not described herein again.

S103: The decision apparatus 220 evaluates the first model and the first policy based on the first sample set. When an evaluation result of the first model is better than an evaluation result of the first policy, the decision apparatus 220 performs S104. When an evaluation result of the first policy is better than an evaluation result of the first model, the decision apparatus 220 performs S105.

It should be understood that a manner in which the decision apparatus 220 evaluates the first model and the first policy is similar to the manner in which the decision apparatus 220 evaluates the plurality of models. For brevity, details are not described herein again.

S104: The decision apparatus 220 sends the first model to the service execution apparatus 210, to enable the service execution apparatus 210 to process a future received service request based on the first model.

S105: The decision apparatus 220 sends the first policy to the service execution apparatus 210, to enable the service execution apparatus 210 to process a future received service request according to the first policy.

Optionally, the first sample set and the second sample set are a same sample set, or the first sample set includes the second sample set. A manner in which the decision apparatus 220 obtains the second sample set is similar to a manner in which the decision apparatus 220 obtains the first sample set. For brevity, details are not described herein again. However, it should be noted that, more service requests included in the first sample set indicate that an evaluation result can more accurately reflect credibility of the first policy and credibility of the first model. Therefore, the first quantity is generally greater than the second quantity. It should be understood that, during actual application, the training sample set, the test sample set, the first sample set, and the second sample set may be adjusted based on an actual case. In this case, when training the initial model, evaluating the plurality of models, evaluating the plurality of policies, and evaluating the first model and the first policy, the decision apparatus 220 may perform corresponding adjustment based on the actual case. For example, the decision apparatus 220 may use all service requests in the second sample set to perform model training, and use the first sample set to evaluate the plurality of models and the plurality of policies, to directly determine a decision manner having a best evaluation effect.

The service execution apparatus 210 may obtain a target decision manner by using a method procedure in which the decision apparatus 220 determines the target decision manner in S101 to S105. In the foregoing method, to improve prediction accuracy of the target decision manner, the decision apparatus 220 first evaluates the plurality of models and the plurality of policies based on the second sample set, to determine the first model and the first policy having better evaluation results, and then evaluates the first model and the first policy based on the first sample set, to select the decision manner having a better evaluation result as a final decision manner. Therefore, a prediction effect of the decision manner is greater than or equal to a prediction effect of the first model. This enables the service execution apparatus 210 to process a future service request more accurately.

Figure 5:
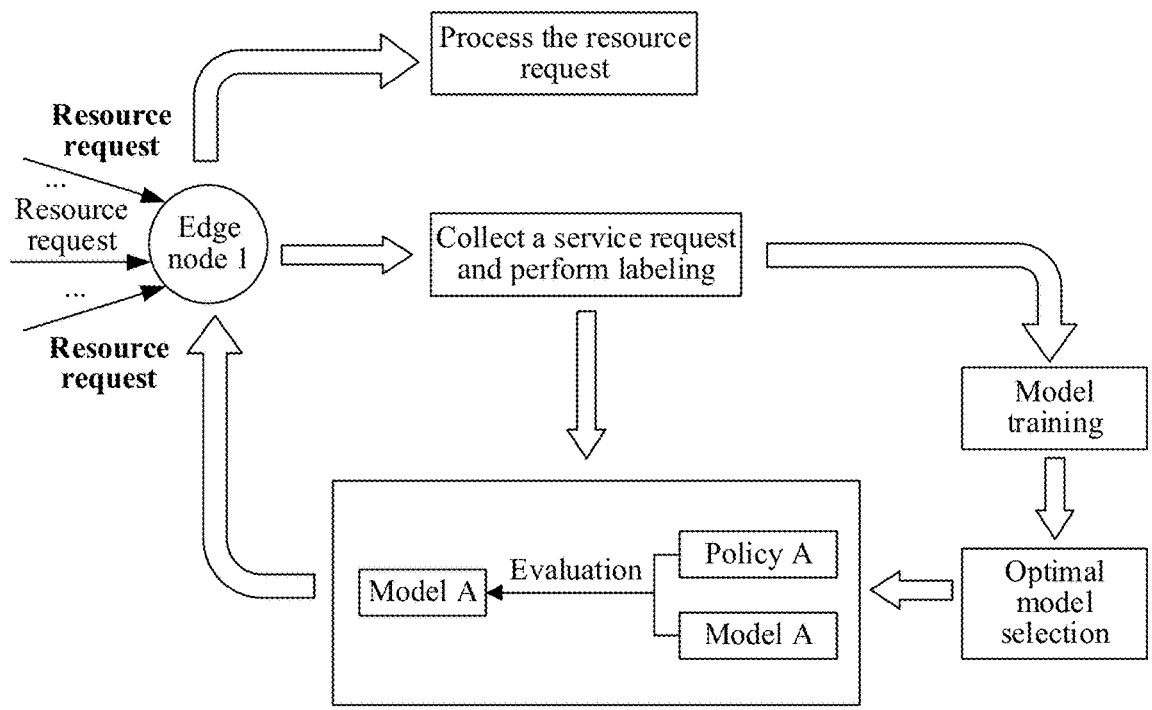
FIG. 5 is a schematic diagram of service execution in a cache scenario according to this disclosure.

The cache scenario shown in FIG. 2 is used as an example for description. As shown in FIG. 5, in a period from 10:00 to 10:10, a plurality of clients send resource requests to an edge node 1. After the edge node 1 receives the resource requests, it is determined whether the edge node 1 stores a to-be-accessed resource. If the edge node 1 stores the to-be-accessed resource, the edge node 1 returns the resource to the clients. If the edge node 1 does not store the to-be-accessed resource, the edge node 1 performs a retrieval operation to obtain a corresponding resource, and selects a model B to determine whether the resource needs to be cached in a cache, a level of cache to which the resource is cached, and duration in which the resource needs to be cached. At the same time, the edge node 1 further collects a first quantity of service requests from the received resource requests, performs labeling, to obtain a first sample set, and then sends the first sample set to the decision apparatus 220. After receiving the first sample set, the decision apparatus 220 selects, from the first sample set, some service requests and labels corresponding to the service requests as a second sample set, and then divides the second sample set to obtain a training sample set and a test sample set. Then, the decision apparatus 220 trains an initial model based on the training sample set, to obtain a model A; determines, based on the test sample set, a model having a higher prediction accuracy rate in the model A and the model B as a model A; evaluates the model A and the policy A by using the first sample set; determines a decision manner having a better evaluation result as a model A, and sends the model A to the edge node 1. After receiving the model A, the edge node 1 updates a decision manner from the model B to the model A. Then, the edge node 1 processes the received resource requests via the model A, to determine whether a resource requested by the clients needs to be cached in the cache, a level of cache to which the resource is cached, and duration in which the resource needs to be cached. Because the decision apparatus 220 periodically performs the foregoing steps, the edge node 1 periodically updates the decision manner. In this way, cache validity of the edge node 1 can be improved, retrieval costs of the edge node 1 can be reduced, and better experience can be brought to a user.

The foregoing describes in detail a specific process in which the decision apparatus 220 determines the decision manner. The following further describes the decision apparatus 220 with reference to FIG. 6 to FIG. 8.

Figure 6:
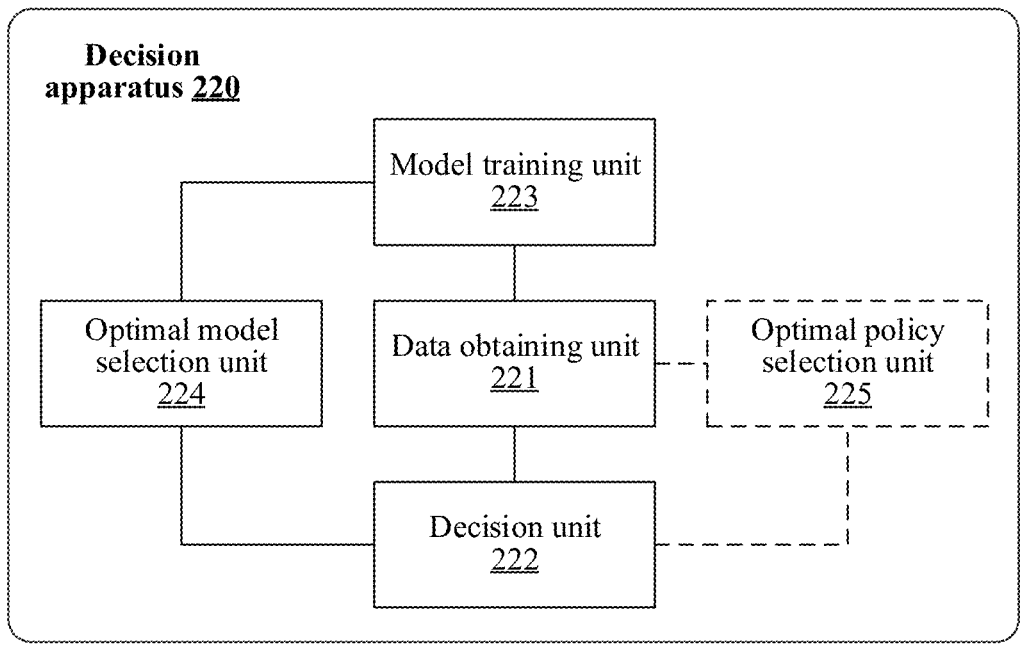
FIG. 6 is a schematic diagram of a structure of a decision apparatus according to this disclosure.

FIG. 6 is a schematic diagram of a structure of a decision apparatus 220 according to this disclosure. It should be understood that FIG. 6 is merely an example of a schematic diagram of a structure of the decision apparatus 220, and division into parts in the decision apparatus 220 is not limited in this disclosure. As shown in FIG. 6, the decision apparatus 220 includes a data obtaining unit 221, a decision unit 222, a model training unit 223, and an optimal model selection unit 224. Optionally, the decision apparatus 220 further includes an optimal policy selection unit 225. The following briefly describes functions of the units in the decision apparatus 220.

The data obtaining unit 221 is configured to obtain a first sample set. The first sample set includes a first quantity of service requests collected by a service execution apparatus from a received service request.

The decision unit 222 is configured to evaluate a first model and a first policy based on the first sample set. When an evaluation result of the first model is better than an evaluation result of the first policy, the decision unit 222 is further configured to send the first model to the service execution apparatus 210, to enable the service execution apparatus 210 to process a future received service request based on the first model. When an evaluation result of the first policy is better than an evaluation result of the first model, the decision unit 222 is further configured to send the first policy to the service execution apparatus 210, to enable the service execution apparatus 210 to process a future received service request according to the first policy.

In a specific embodiment, the data obtaining unit 221 is further configured to obtain a second sample set. The second sample set includes a second quantity of service requests collected by the service execution apparatus from the received service request, and the second sample set includes a training sample set and a test sample set. The model training unit 223 is configured to obtain a plurality of models. The plurality of models include a model that is obtained by the model training unit 223 by training an initial model based on the training sample set, and a model that is obtained by the model training unit 223 by training the initial model based on a historical service request. The historical service request is received by the service execution apparatus 210 before the service execution apparatus 210 collects the second quantity of service requests from the received service request. The optimal model selection unit 224 is configured to evaluate the plurality of models based on the test sample set, to determine the first model. The first model is a model having a best evaluation result in the plurality of models.

In a specific embodiment, the optimal policy selection unit 225 is configured to obtain a plurality of policies, and then evaluate the plurality of policies based on the second sample set, to determine the first policy. The first policy is a policy having a best evaluation result in the plurality of policies.

For brevity, each unit in the decision apparatus 220 is not described in detail in this embodiment of this disclosure. For specific functions of each unit, refer to the foregoing S101 to S105. The data obtaining unit 221 is configured to perform the step of obtaining the second sample set in S101 and S102. The model training unit 223 is configured to perform the step of obtaining the plurality of models in S102. The optimal model selection unit 224 is configured to perform the step of determining the first model from the plurality of models in S102. The optimal policy selection unit 225 is configured to perform the step of determining the first policy in S102. The decision unit 222 is configured to perform S103 to S105.

Due to the functions of each unit, the decision apparatus 220 provided in this disclosure may determine, based on an actual case, a decision manner applicable to the future received service request processed by the service execution apparatus 210, to improve feasibility of a processing result of the future received service request, and improve credibility of service execution.

Figure 7:
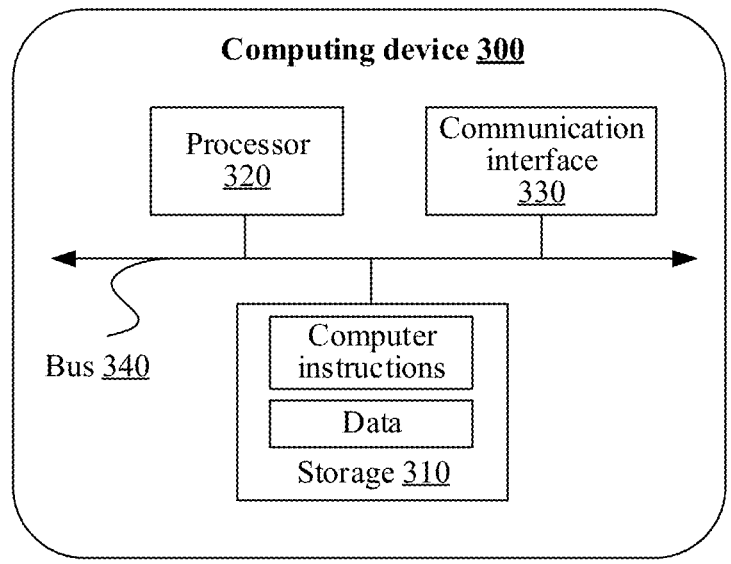
FIG. 7 is a schematic diagram of a structure of a computing device according to this disclosure.

The decision apparatus 220 may be independently deployed on a computing device in any environment (for example, independently deployed on a terminal computing device). FIG. 7 is a schematic diagram of a structure of a computing device 300 on which a decision apparatus 220 is deployed. As shown in FIG. 7, the computing device 300 includes a storage 310, a processor 320, a communication interface 330, and a bus 340. The storage 310, the processor 320, and the communication interface 330 implement mutual communication connections through the bus 340.

The storage 310 may be a read-only memory (ROM), a static storage device, a dynamic storage device, or a random-access memory (RAM). The storage 310 may store computer instructions, for example, computer instructions in a data obtaining unit 221, computer instructions in a decision unit 222, computer instructions in a model training unit 223, computer instructions in an optimal model selection unit 224, and computer instructions in an optimal policy selection unit 225. When a program stored in the storage 310 is executed by the processor 320, the processor 320 and the communication interface 330 are configured to perform some or all of the method described in the steps S101 to S105. The storage 310 may further store data. For example, some storage resources in the storage 310 may be used to store a first sample set and a second sample set that are stored in the data obtaining unit 221, and some storage resources are used to store intermediate data or result data generated by the processor 320 in an execution process, for example, a first model and a first policy.

The processor 320 may be a general-purpose central processing unit (CPU), a microprocessor, an application-specific integrated circuit (ASIC), a graphics processing unit (GPU), or one or more integrated circuits.

The processor 320 may alternatively be an integrated circuit chip and has a signal processing capability. In an implementation process, some or all functions of the decision apparatus 220 may be completed by using an integrated logic circuit of hardware in the processor 320 or instructions in a form of software. The processor 320 may alternatively be a general-purpose processor, a digital signal processor (DSP), a field-programmable gate array (FPGA) or another programmable logic device, a discrete gate or transistor logic device, or a discrete hardware component, and may implement or perform the method, steps, and logical block diagrams disclosed in embodiments of this disclosure. The general-purpose processor may be a microprocessor, or the processor may be any conventional processor or the like. The steps of the method disclosed with reference to embodiments of this disclosure may be directly performed and completed by a hardware decoding processor, or may be performed and completed by using a combination of hardware and software modules in the decoding processor. The software modules may be located in a mature storage medium in the art, such as a random access memory, a flash memory, a read-only memory, a programmable read-only memory, an electrically erasable programmable memory, a register, or the like. The storage medium is located in the storage 310. The processor 320 reads information in the storage 310, and completes some or all functions of the decision apparatus 220 in combination with the hardware in the processor 320.

The communication interface 330 uses a transceiver module, for example but not for limitation, a transceiver, to implement communication between the computing device 300 and another device or communication network. For example, an original sample set uploaded by a user may be obtained through the communication interface 330, or a trained classification model may be sent to another device through the communication interface 330.

The bus 340 may include a path for transmitting information between the components (for example, the storage 310, the processor 320, and the communication interface 330) in the computing device 300.

Figure 8:
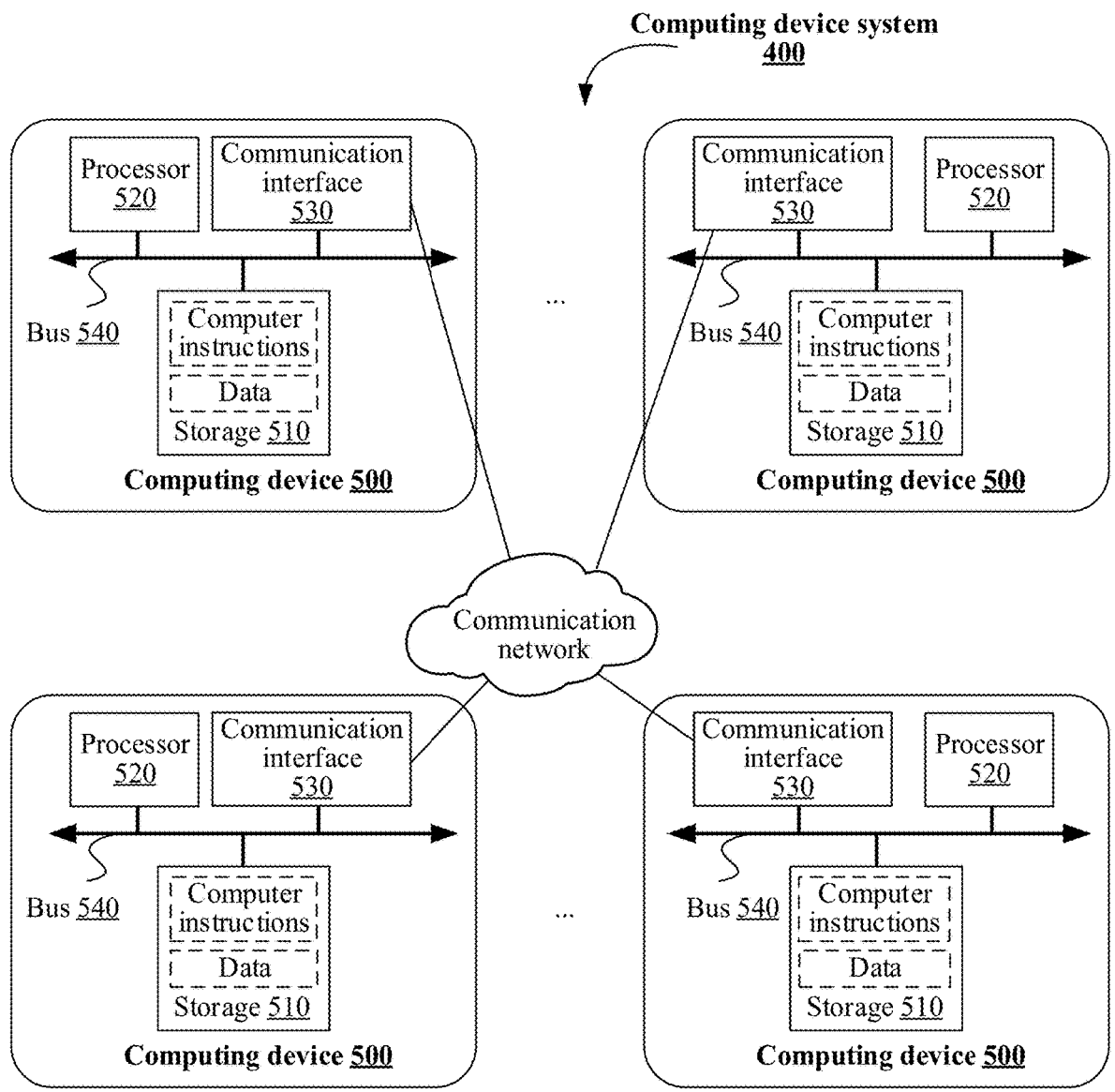
FIG. 8 is a schematic diagram of a structure of a computer system according to this disclosure.

Each unit in the decision apparatus 220 may alternatively be deployed on a plurality of computing devices in a same environment or different environments in a distributed manner. FIG. 8 is a schematic diagram of a structure of a computing device system including a plurality of computing devices on which a decision apparatus 220 is deployed. As shown in FIG. 8, the computing device system 400 includes a plurality of computing devices 500, and the plurality of computing devices 500 may execute computer instructions via an internal processor, to collaboratively implement functions of the decision apparatus 220. Each computing device 500 includes a storage 510, a processor 520, a communication interface 530, and a bus 540. The storage 510, the processor 520, and the communication interface 530 implement mutual communication connections through the bus 540.

The storage 510 may be a ROM, a RAM, a static storage device, or a dynamic storage device. The storage 510 may store computer instructions. When the computer instructions stored in the storage 510 are executed by the processor 520, the processor 520 and the communication interface 530 are configured to perform some or all of the method described in the steps S101 to S105. The storage 510 may further store data. For example, some storage resources in the storage 510 may be used to store a first sample set and a second sample set that are stored in a data obtaining unit 221, and some storage resources are used to store intermediate data or result data generated by the processor 520 in an execution process, for example, a first model and a first policy.

The processor 520 may be a general-purpose CPU, a GPU, an ASIC, a microprocessor, or one or more integrated circuits. The processor 520 may alternatively be an integrated circuit chip and has a signal processing capability. In an implementation process, some or all functions of a model training system of this disclosure may be completed by using an integrated logic circuit of hardware in the processor 520 or instructions in a form of software. The processor 520 may be a DSP, an FPGA, another programmable logic device, a general-purpose processor, a discrete gate, a discrete hardware component, or a transistor logic device, and may implement or perform the method, steps, and logical block diagrams disclosed in embodiments of this disclosure. The general-purpose processor may be a microprocessor, or the processor may be any conventional processor or the like. The steps of the method disclosed with reference to embodiments of this disclosure may be directly performed and completed by a hardware decoding processor, or may be performed and completed by using a combination of hardware and software modules in the decoding processor. The software modules may be located in a mature storage medium in the art, such as a random access memory, a flash memory, a read-only memory, a programmable read-only memory, an electrically erasable programmable memory, a register, or the like. The storage medium is located in the storage 510. The processor 520 reads information in the storage 510, and completes some functions of the decision apparatus 220 in combination with the hardware in the processor 520.

The communication interface 530 uses a transceiver module, for example but not for limitation, a transceiver, to implement communication between the computing device 500 and another device or communication network. For example, to-be-labeled sample dataset uploaded by a user may be obtained through the communication interface 530.

The bus 540 may include a path for transmitting information between the components (for example, the storage 510, the processor 520, and the communication interface 530) in the computing device 500.

A communication path is established between each computing device 500 over a communication network. A part (for example, one or more units of the data obtaining unit 221, a decision unit 222, a model training unit 223, an optimal model selection unit 224, and an optimal policy selection unit 225 in the decision apparatus 220) of the decision apparatus 220 runs on each computing device 500. Any computing device 500 may be a server in a cloud data center, a computing device in an edge data center, or a terminal computing device.

The descriptions of the procedures corresponding to each accompanying drawing have respective focuses. For a part that is not described in detail in a procedure, refer to related descriptions of another procedure.

All or some of the foregoing embodiments may be implemented by using software, hardware, or a combination thereof. When the software is used to implement the foregoing embodiments, all or some of the foregoing embodiments may be implemented in a form of a computer program product. A computer program product that provides the model training system includes one or more computing instructions executed by the model training system. When these computer program instructions are loaded and executed on a computer, all or some of the procedures or functions according to the figures in embodiments of this disclosure are generated.

The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a twisted pair) or wireless (for example, infrared, radio, or microwave) manner. The computer-readable storage medium stores the computer program instructions that provide the model training system. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a compact disc), a semiconductor medium (for example, an SSD), or the like.

What is claimed is:

1. A system for service execution comprising:
a service execution apparatus configured to:
collect a first quantity of service requests from a first received service request to obtain a first sample set;
send the first sample set;
receive a first model or a first policy; and
process a second received service request based on one of the first model or the first policy; and
a decision apparatus configured to:
receive the first sample set from the service execution apparatus;
evaluate the first model and the first policy based on the first sample set to obtain a first prediction accuracy of the first model and a second prediction accuracy of the first policy;
send the first model to the service execution apparatus when the first prediction accuracy is greater than the second prediction accuracy; and
send the first policy to the service execution apparatus when the second prediction accuracy is greater than the first prediction accuracy.

2. The system according to claim 1, wherein the service execution apparatus is further configured to:
receive a historical service request;
collect a second quantity of service requests from the first received service request to obtain a second sample set, wherein the second sample set comprises a training sample set and a test sample set; and
send the second sample set and the historical service request to the decision apparatus.

3. The system according to claim 2, wherein the decision apparatus is further configured to:
obtain a plurality of policies; and
evaluate the plurality of policies based on the second sample set to select the first policy, wherein the first policy has a highest prediction accuracy in the plurality of policies.

4. The system according to claim 2, wherein the first sample set and the second sample set are similar sample sets, or wherein the first sample set comprises the second sample set.

5. A method for decision making the method comprising:
receiving, from a service execution apparatus, a first sample set, wherein the first sample set comprises a first quantity of service requests from a first received service request;
evaluating a first model and a first policy based on the first sample set to obtain a first prediction accuracy of the first model and a second prediction accuracy of the first policy;
sending the first model to the service execution apparatus when the first prediction accuracy is greater than the second prediction accuracy; and
sending the first policy to the service execution apparatus when the second prediction accuracy is greater than the first prediction accuracy.

6. The method according to claim 5, further comprising:
receiving a second sample set, wherein the second sample set comprises a second quantity of service requests from the first received service request, and wherein the second sample set comprises a training sample set and a test sample set;
obtaining a plurality of models, wherein the plurality of models comprise a second model based on the training sample set and a third model based on a historical service request; and
evaluating the plurality of models based on the test sample set, to select the first model, wherein the first model has a highest prediction accuracy in the plurality of models.

7. The method according to claim 6, further comprising:
obtaining a plurality of policies; and
evaluating the plurality of policies based on the second sample set to select the first policy, wherein the first policy is a policy having a best evaluation result in the plurality of policies.

8. The method according to claim 6, wherein the first sample set and the second sample set are similar sample sets, or the first sample set comprises the second sample set.

9. A computing device comprising:
at least one memory configured to store instructions; and
at least one processor coupled to the at least one memory and configured to execute the instructions to cause the computing device to:
obtain, from a service execution apparatus, a first sample set, wherein the first sample set comprises a first quantity of service requests from a first received service request;
evaluate a first model and a first policy based on the first sample set to obtain a first prediction accuracy of the first model and a second prediction accuracy of the first policy;
send the first model to the service execution apparatus when the first prediction accuracy is greater than the second prediction accuracy; and
send the first policy to the service execution apparatus when the second prediction accuracy is greater than the first prediction accuracy.

10. The system according to claim 2, wherein the service execution apparatus is further configured to collect the second quantity of service requests before the decision apparatus evaluates the first model and the first policy.

11. The system according to claim 2, wherein the decision apparatus is further configured to:
obtain a plurality of models including a second model based on the training sample set and a third model based on the historical service request; and
evaluate the plurality of models based on the test sample set to select the first model from the plurality of models, wherein the first model has a highest prediction accuracy in the plurality of models.

12. The system according to claim 11, wherein the decision apparatus is further configured to:
obtain the second model by training an initial model based on the training sample set; and
obtain the third model by training the initial model based on the historical service request.

13. The system according to claim 11, wherein the service execution apparatus is further configured to receive the historical service request before collecting the second quantity of service requests from the first received service request.

14. The system according to claim 3, wherein the decision apparatus is further configured to obtain the plurality of policies before evaluating the first model and the first policy.

15. The method according to claim 6, wherein the first sample set and the second sample set are similar sample sets, or wherein the first sample set comprises the second sample set.

16. The method according to claim 6, wherein the second sample set is received before evaluating the first model and the first policy.

17. The method according to claim 6, further comprising:
obtaining the second model by training an initial model based on the training sample set; and
obtaining the third model by training the initial model based on the historical service request.

18. The method according to claim 6, further comprising receiving, from the service execution apparatus, the historical service request before collecting the second quantity of service requests.

19. The method according to claim 7, wherein the plurality of policies is obtained before evaluating the first model and the first policy.

20. The method according to claim 5, wherein the first policy is a least recently used (LRU) policy in a cache, and wherein the LRU policy indicates that a least recently accessed object in a cache is evicted to store a new object when storage space of the cache is insufficient.

* * * * *